United States Patent [19]
Shaffer et al.

[11] Patent Number: 6,122,743
[45] Date of Patent: Sep. 19, 2000

[54] SYSTEM FOR PROVIDING ENHANCED SECURITY FOR TRANSACTIONS TRANSMITTED THROUGH A DISTRIBUTED NETWORK

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 09/052,812

[22] Filed: Mar. 31, 1998

[51] Int. Cl.[7] .................................. H04J 3/24; H04L 9/00
[52] U.S. Cl. ........................................... 713/201; 370/94.1
[58] Field of Search ................................. 713/201, 200; 370/235

[56] References Cited

U.S. PATENT DOCUMENTS

| | | | |
|---|---|---|---|
| 4,500,989 | 2/1985 | Dahod | 370/431 |
| 4,888,800 | 12/1989 | Marshall et al. | 380/281 |
| 4,965,827 | 10/1990 | McDonald | 380/30 |
| 5,151,899 | 9/1992 | Thomas et al. | 370/394 |
| 5,475,763 | 12/1995 | Kaufman et al. | 380/30 |
| 5,594,869 | 1/1997 | Hawe et al. | 713/201 |
| 5,699,512 | 12/1997 | Moriyasu et al. | 713/201 |
| 5,784,462 | 7/1998 | Tomida et al. | 380/270 |
| 5,909,437 | 6/1999 | Rhodes et al. | 713/2 |

OTHER PUBLICATIONS

Giles, Roosevelt. Internet Security (Firewalls that Offer both Security and Flexibility). Network VAR. pp. 4–5, Mar. 1997.

*Primary Examiner*—Ly V. Hua

[57] ABSTRACT

Transactions sent from a source node to a destination node interconnected by a distributed network are protected from interception by a third party by passing the transaction data into several packets which are renumbered as a pseudo-random sequence and sent along different routes from the source node to the destination node.

10 Claims, 6 Drawing Sheets

Transaction Data: 1 2 3 4 5 6 7 8 9 1 2 3 4 5 6 7 (300)

FIG. 3B

| Packet Number | 1 | 2 | 3 | 4 | 5 | 6 | 7 | 8 |
|---|---|---|---|---|---|---|---|---|
| | 12 | 34 | 56 | 78 | 91 | 23 | 45 | 67 |

| Packet Number | 17 | 32 | 46 | 53 | 61 | 80 | 89 | 97 |
|---|---|---|---|---|---|---|---|---|
| | 12 | 34 | 56 | 78 | 91 | 23 | 45 | 67 |

| Packet Number | 20 | 34 | 57 | 62 | 81 | 88 | 95 | 101 | 111 | 119 | 132 | 147 | 160 | 173 | 189 | 210 |
|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 |

SYSTEM FOR PROVIDING ENHANCED SECURITY FOR TRANSACTIONS TRANSMITTED THROUGH A DISTRIBUTED NETWORK

FIELD OF THE INVENTION

The present invention is directed to the field of network security, and more specifically to preventing third parties from intercepting data transmissions over a network.

BACKGROUND OF THE INVENTION

As the world becomes ever more tightly connected with the proliferation and increasing popularity of the Internet, electronic commerce will become increasingly important in our lives. Banks and other financial institutions allow customers to access their accounts over the Internet; brokerage houses allow clients to trade stocks, mutual funds and other securities over the Internet; and manufacturers, wholesalers, and retailers allow customers to order and pay for products over the Internet. While the most significant financial transactions are still carried out over private electronic data interchange (EDI), bank, and interbank networks, consumer credit card transactions are carried out over the Internet with increasing frequency. While most of these credit card transactions are carried out with some form of encryption, user anxiety remains high because messages can be intercepted by third parties and translated at leisure, using common decryption techniques. Even though a relatively small percentage of Internet transactions contain credit card numbers, one could simply locate a merchant that accepts credit card transactions and search for those transactions having the merchant's IP address. This is guaranteed to lead to the discovery of numerous credit card containing packets which can then be decrypted offline.

SUMMARY OF THE INVENTION

The present invention is a method of providing enhanced data security to transactions between two stations connected by a network such as the Internet. Rather than relying on encryption techniques which can be broken, the present invention takes advantage of the packetization of Internet messages. Every transaction occurring on the Internet is split into a number of different IP packets. For instance, a credit card number having 16 digits could be split into 16 IP packets. Normally, IP packets are all sent along the same route from the source to the destination. In the method of the present invention; however, the packets are sent using many different routes. This reduces the chances of a third party being able to intercept all the packets of a particular transaction. Additionally, according to the present invention, the IP packets are not numbered sequentially, but instead are numbered as an ordered sequence of random numbers. In this way, even if a third party is able to intercept a large percentage of the IP packets for a given transaction, the third party cannot know how many packets are missing or where in the sequence they might be missing from. The intended receiver, on the other hand, will receive all the packets and merely has to put them in numerical order.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
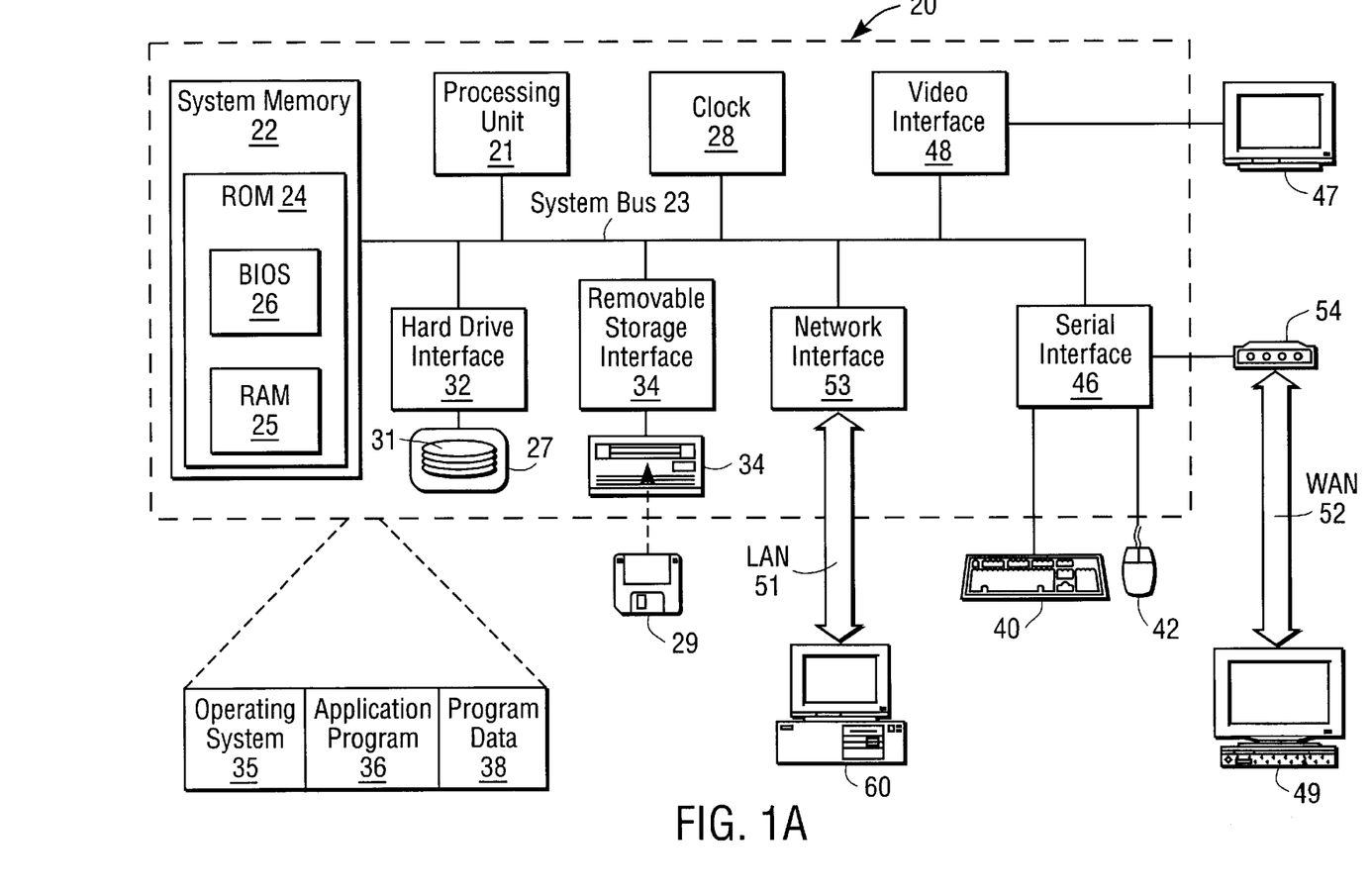
FIG. 1A is a block diagram of a general purpose computer system for implementing the present invention.
Figure 1B:
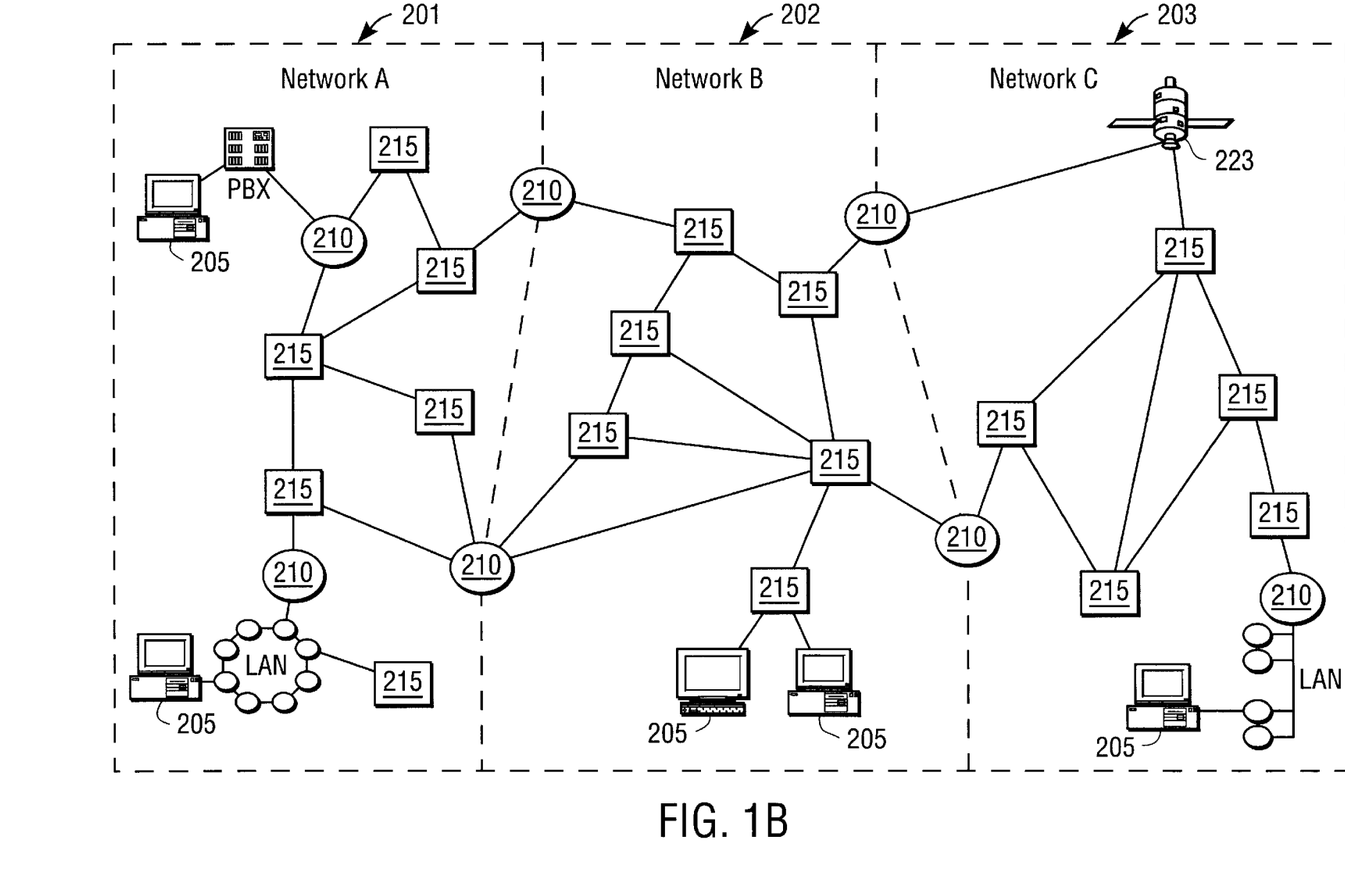
FIG. 1B is a diagram of a network for implementing the present invention.

The present invention is directed to a system for providing enhanced security to transactions sent from a client computer to a server computer through a distributed network. In accordance with the present invention, the system of the present invention executes on a computer, such as a general purpose personal computer. FIGS. 1A–1B and the following discussion are intended to provide a brief, general description of a suitable computing environment in which the invention may be implemented. Although not required, the invention will generally be implemented as computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, multiprocessor systems, minicomputers, and mainframe computers. The invention may also be practiced in distributed computing environments where tasks are performed by remote processing devices that are linked through a communications network. In a distributed computing environment, program modules may be located in both local and remote memory storage devices.

With reference to FIG. 1A, an exemplary system for implementing the invention includes a general purpose computing device such as a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. System timing is provided by a clock signal (not shown) applied to the system bus 23. The system memory includes read only memory (ROM) 24 and random access memory (RAM) 25. A basic input/output system 26 (BIOS) is stored in ROM 24, and contains the basic routines that helps to transfer information between elements within the personal computer 20, such as during start-up. The personal computer 20 further includes storage devices such as a hard disk drive 27 connected to the system bus through a hard disk drive interface 32 for reading data from and writing data to a hard disk 31. In addition, one or more removable disk drives 30 are connected to the system bus through one or more removable storage interfaces 34 for reading data from or writing data to removable storage 29, such as floppy disks, removable magnetic disks, CD-ROMs or other optical media. The drives and their associated computer-readable media provide nonvolatile storage of computer readable instructions, data structures, program modules and other data for the personal computer 20. Although the exemplary environment described herein employs a hard disk and removable media, it should be appreciated by those skilled in the art that other types of computer-readable media which can store data that is accessible by a computer, such as magnetic cassettes, flash memory cards, digital versatile disks (also known as Digital Video Disks or DVDs), Bernoulli cartridges, random access memories (RAMs), read only memories (ROMs), and the like, may also be used in the exemplary operating environment.

A number of program modules may be stored on the storage devices, including an operating system 35, one or more application programs 36, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial interface 46 that is coupled to the system bus, but may be connected by other interfaces, such as a parallel port, game port or a universal serial bus (USB). A display device 47, such as a monitor, is also connected to the system bus 23 via a video interface 48. In addition to the monitor, personal computers typically include other peripheral output devices (not shown), such as printers and plotters.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20. The logical connections depicted in FIG. 1A include a local area network (LAN) 51 and a wide area network (WAN) 52, Such networking environments are commonplace in offices, enterprise-wide computer networks, intranets and global networks such as the Internet. As depicted in FIG. 1A, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the Internet. The modem 54, which may be internal or external, is connected to the system bus 23 via the serial interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIG. 1B depicts an exemplary distributed communications network including a variety of interconnected networks. Geographically distributed networks such as network A 201, network B 202, and network C 203 are interconnected via gateways 210, which provide the necessary interfacing between disparate networks of possibly different bandwidths and packet handling capabilities as well as possibly different architectures. Each of networks A, B, and C may be made up of a number of network nodes 215. The network nodes 215 communicate with each other through physical links as well as through radio or microwave transmissions through relay stations such as a satellite 223.

A user at a terminal or personal computer 205 may access a network through a common access point at a network node 215, a local area network (LAN) 220, 221, a digital PBX 225, or any other common network access points. Two or the more popular local area network architectures are depicted, the ring 220, and the bus 221, but other network topologies may also be employed. While the following discussion is directed to an Internet environment, the teachings of the present invention are applicable to any distributed network environment. In the present invention, personal computer 20 is connected to a distributed network such as the Internet, either directly through to modem 54 to a remote computer 49 which serves as an Internet Service Provider (ISP), an Internet router, or through a LAN 51 to a remote computer 60 which serves as the local area network's Internet gateway 210. Each node in the path between the user's personal computer 20 and the server computer acts as an Internet router. An Internet router typically either maintains a routing table having entries representing every other router on the network, or has a mechanism for determining a route or for asking an adjacent router for routing information. The routing table will also typically include statistics concerning the link between the node and each other connected node so that information is available as to the "best" path from the node to another node. Typically, routing tables contain entries for a primary route, as well as one or more alternate routes. Alternatively, a routing algorithm may be used to establish an appropriate routing path from the client to the server. Both routing tables and routing algorithms are well known in the art and will not be discussed further. Internet routers and ISPs will be referred to collectively as "routers" in the remainder of the discussion.

A user typically interacts with the Internet through web browser software (not shown) running on a personal computer 20. The web browser software allows the user to access remote server computers on the Internet through a Uniform Resource Locator (URL), which serves as a server's network address. Examples of suitable web browsers include Explorer™, available from Microsoft Corporation, of Redmond, Wash., or Navigator™, available from Netscape Communications of Mountain View, Calif. When the user enters or selects a URL through the web browser, the URL is forwarded to the router, where a table is checked to determine a "best" path to a next node from the router to the server designated by the URL. Interaction between a web browser (the client) and a server will typically be through use of the Hypertext Transfer Protocol (HTTP), which includes specific communication methods that allow clients to request data from a server and send information to the server. According to the Hypertext Transport Protocol, the client contacts the server at the Internet address as specified in the URL to open the connection. The client then sends a message to the server requesting service as specified by a request header that defines a method requested for the transaction. Typical HTTP methods are the GET, for getting an object from a server, and the POST, for posting data to an object on the server. The server then sends a response to the client consisting of response headers describing the state of the transmission, followed by the actual data. The connection is then closed. In a typical user interaction with the Internet, the user is requesting a web page written in the Hypertext Markup Language (HTML) from a server in the World Wide Web (WWW). Depending on the content of the web page, the user may further interact with the server by sending additional information to the server. All such transmissions to the server will hereinafter be referred to as "transactions."

Figure 2:
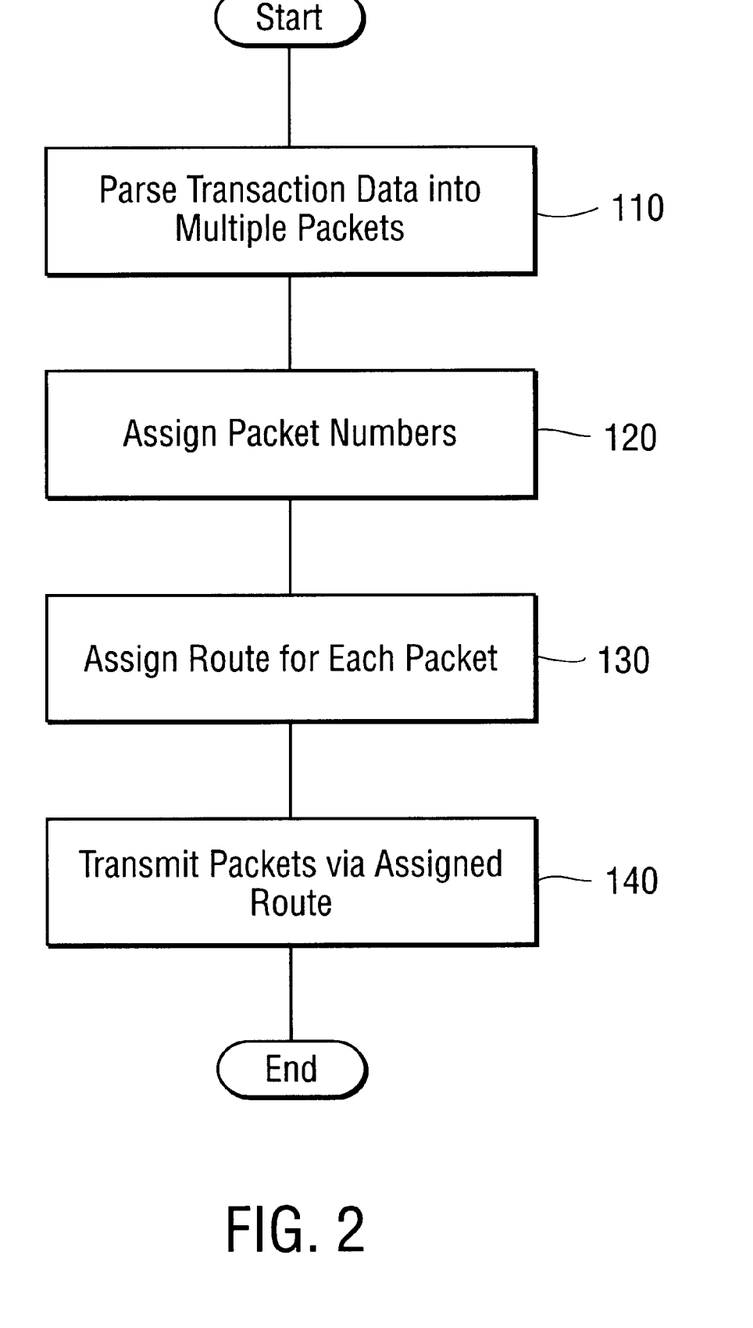
FIG. 2 is a flow chart depicting an overall operation of the present invention.

FIG. 2 depicts a flow chart describing an overall method of providing enhanced security to a transaction on a computer network according to the present invention. Greater detail is provided in the discussions accompanying FIGS. 3A–3D, 4 and 5. Referring to FIG. 2, beginning with step 110, transaction data is parceled into a number of different packets. The packets are then assigned packet numbers at a step 120. Each packet is then assigned a route to its intended destination at a step 130, and the packets are then transmitted from the source to the destination via the assigned route at a step 140.

Figure 3A:
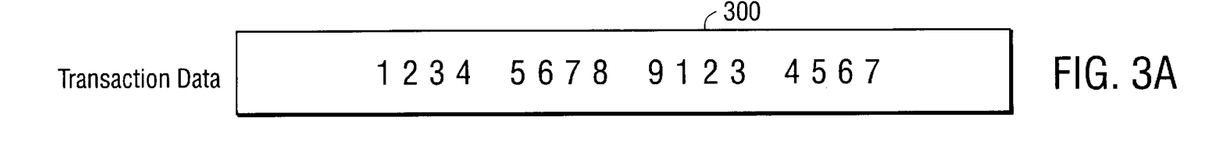
FIGS. 3A–3D depict exemplary Internet packet numbering schemes according to the prior art and the present invention.
Figure 3B:
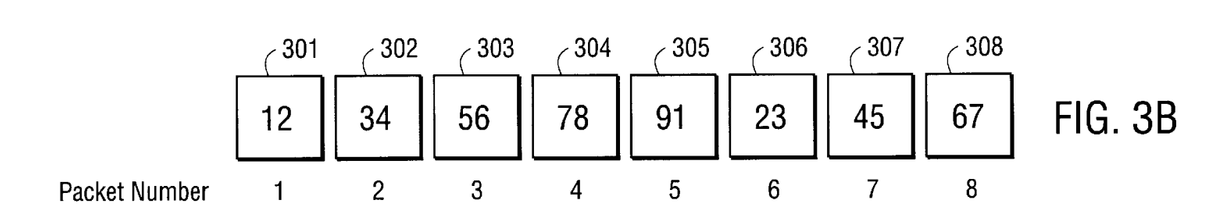
Figure 3C:
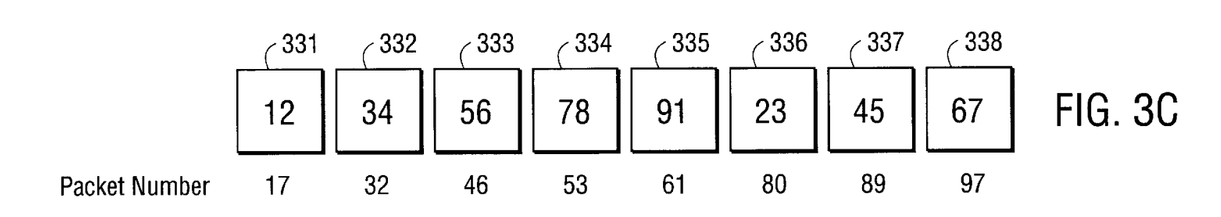
Figure 3D:
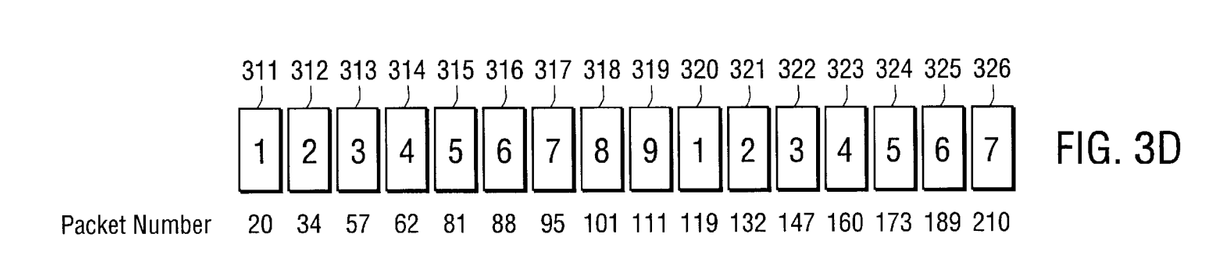

Referring to FIGS. 3A–3D, the data to be passed between the client computer and a server is typically transmitted as one or more packets. In FIG. 3A, transaction data 300 may include such information as a 16-digit credit card number, as shown. According to prior art Internet packet routing techniques, the transaction data 300 may be divided into a number of packets. For example, as shown in FIG. 3B, the transaction data 300 has been divided into eight packets 301–308, each containing two characters of transaction data. Packets 301–308 are assigned packet numbers 1–8, respectively. According to a present embodiment of the invention, the transaction data is also divided into eight packets 331–338, but the packets in the sequence are assigned packets numbers according to a pseudo-random ordering. The sequence is referred to as pseudo-random in that the resulting sequence is preferably an increasing or decreasing series of random numbers. In other words, beginning with a first random number for the first packet, each subsequent packet number is calculated by taking a new random number and either adding or subtracting it from the first random number, depending on whether an increasing or decreasing sequence is desired. For a decreasing sequence, the random number for the first packet should be added to a base value large enough to ensure that subtracting subsequent random numbers will not result in a negative value. Each random number may have the same seed value or may have any number of different seed values. The packet renumbering scheme should be such that no two packets have adjacent numbers in order to increase the effectiveness of the security. In the example shown in FIG. 3C, the transaction data has been divided into eight packets 331–338 that have been assigned packet numbers in increasing pseudo-random sequence, 17-32-46-53-61-80-89-97. Alternatively, the transaction data may be divided into a larger number of packets. For example, as shown in FIG. 3D, the transaction data has been divided into 16 packets 311–326, and the packets have been assigned packet numbers 20-34-57-62-81-88-95-101-111-119-132-147-160-173-189-210, as an increasing pseudo-random sequence.

Figure 4:
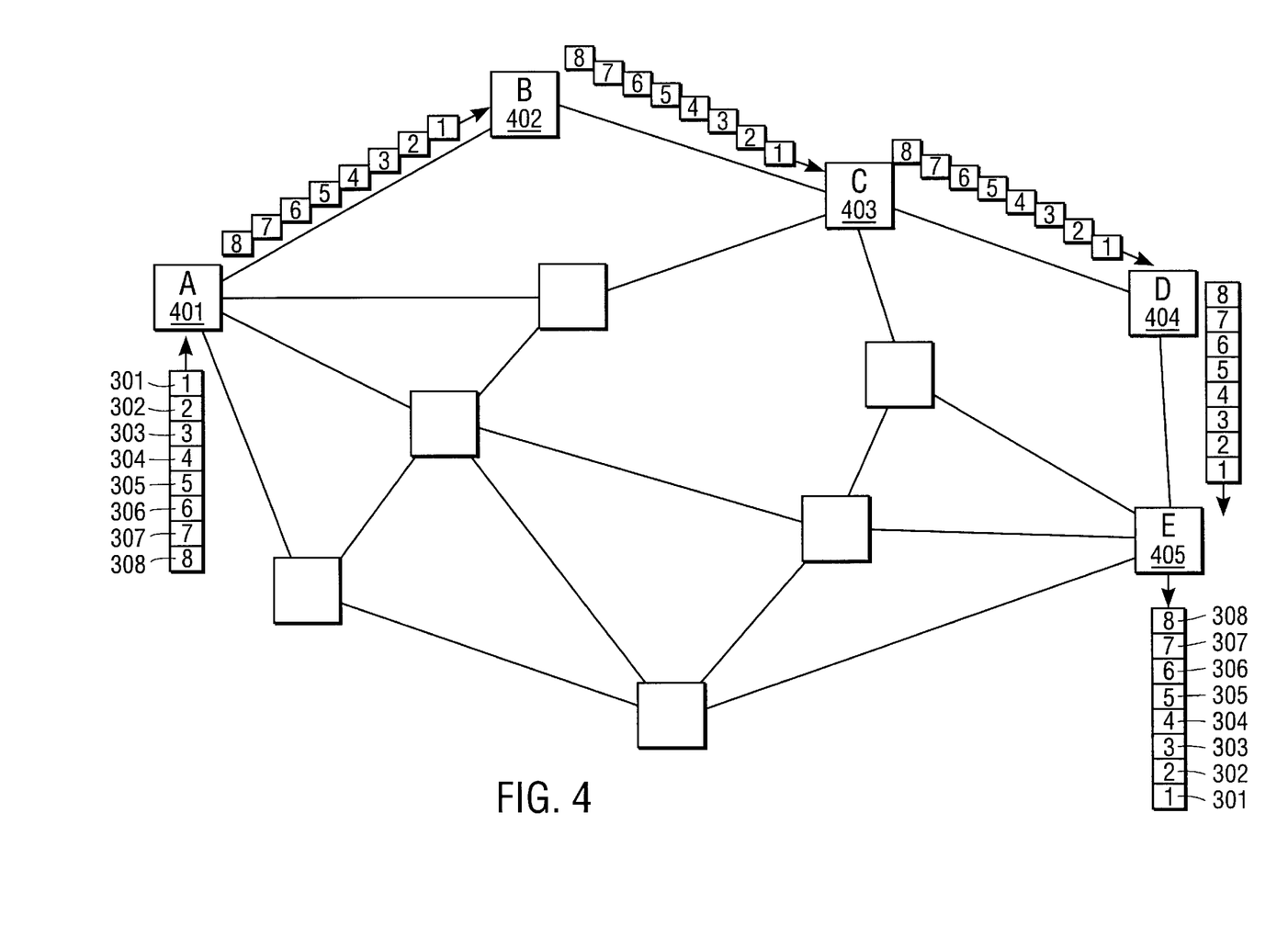
FIG. 4 depicts Internet packet routing according to the prior art.

FIG. 4 illustrates a conventional method of routing of Internet packets. For purposes of illustration, the Internet packets 301–308 are depicted with packet numbers 1–8, respectively, within the packet rather than the corresponding transaction data. As shown in FIG. 4, a source node A 401 is connected to a destination node E 405 through a number of interconnected network nodes.

From the source node A 401, each packet of the transaction is transferred, in turn, through a number of intermediate nodes B 402, C 403, D 404 before reaching the destination E 405. Generally, unless a failure occurs in a link between nodes in a route after transmission has begun, all packets of a transaction are sent along the same route, which is typically a "best" available route. Upon receipt at the destination node E 405, the server merely has to reassemble the packets in sequence to reconstruct the transaction data.

The problem with the prior art approach to Internet packet routing is that a third party interested in capturing credit card numbers or other sensitive data could simply monitor a selected network node for network traffic containing URLs or other network addresses for destination nodes known to accept the credit card numbers or other sensitive information. For instance, many mail-order companies now offer on-line purchasing of products through the Internet. A third party could monitor a network node for all traffic addressed to the mail-order company. The captured network traffic could then be analyzed at the third party's leisure to locate the credit card numbers. Even where prior art encryption techniques are employed, the third party would still have a considerable amount of time to decrypt the information using common techniques. Even if the third party were to miss a small number of packets in the sequence, because the Internet packets are sequentially numbered, the third party would know which packets are missing and could apply a common number substitution to successively substitute each possible character or permutation of characters that would appear in the missing packet in an attempt to find a valid credit card number.

Figure 5:
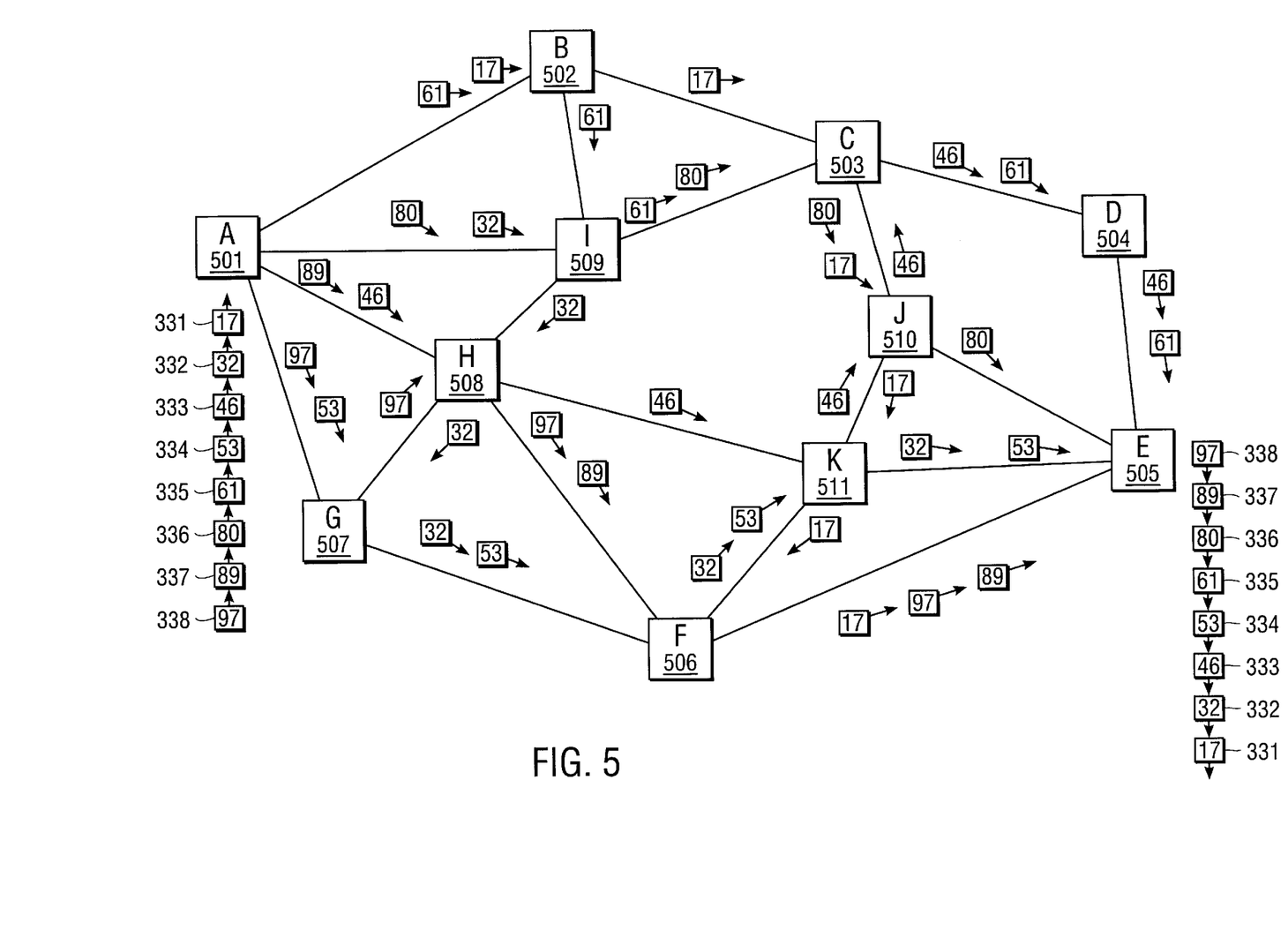
FIG. 5 depicts the routing of renumbered Internet packets according to the present invention.

FIG. 5 depicts an exemplary routing of transaction data 300 according to an embodiment of the present invention. The transaction data 300 is divided into 8 packets as shown in FIG. 3C. For purposes of illustration, the Internet packets 331–338 are depicted with packet numbers 17-32-46-53-61-80-89-97, respectively, within the packet rather than the corresponding transaction data. These packets of the transaction data enter a source node A 501, whereupon the packets are sent along different routes to destination node, E 505. In a present embodiment of the invention, the different routes are forced by sending an indication along with each packet to choose randomly from among several possible routes.

For instance, in the example of FIG. 5, the network includes a number of intermediate nodes B 502, C 503, D 504, F 506, G 507, H 508, I 509, J 510, and K 511, all of which are interconnected such that Internet packets may travel over a number of routes when being sent from the source node to the destination node. For example, one exemplary routing assigned to each of the packets of the transaction data is shown in Table 1 below.

TABLE 1

| Packet Number | Route |
|---|---|
| 17 | A-B-C-J-K-F-E |
| 32 | A-I-H-G-K-E |
| 46 | A-H-K-J-C-D-E |
| 53 | A-H-F-K-E |
| 61 | A-B-I-C-D-E |
| 80 | A-I-C-J-E |
| 89 | A-H-F-E |
| 97 | A-G-H-F-E |

Since each of the packets are transmitted along different routes, it is likely that they will arrive at their destination in an order other than their initial transmission order. However, since the packets have been numbered as either an increasing or decreasing series, the packets merely have to be placed in a corresponding increasing or decreasing order to reconstruct the transaction data.

With the present invention, a third party monitoring transmissions at any given node will only capture a small portion of the total number of packets making up a transaction. For instance, if the third party is monitoring the Internet at node D 504, only 2 of the 8 packets of the transaction data 300 would be captured. Even if the third party knows of the sequencing scheme of the present invention, for example, the packets are numbered in an increasing sequence, only the relative order of the intercepted packets would be known. While the third party could try a high-speed substitution in an attempt to guess the missing digits, the third party would have no way of knowing how many packets were missing, or where to try the substitutions.

As will be appreciated, the present invention increases the security of the transaction data transmitted on a public network by encoding the relative position of a packet within a data stream and by assigning different routes to the packets to lessen the likelihood that packets will be intercepted. Further, as will be appreciated by those skilled in the art, further security can be provided by applying encryption techniques to the data contained within as is well known in the prior art.

What is claimed is:

1. A method of transmitting transaction data comprising a sequence of characters from a source node to a destination node through a distributed network, the method comprising:
   a. distributing the sequence of characters among a plurality of packets;
   b. assigning each packet of the plurality of packets a packet number according to a pseudo-random function such that the packet numbers form a pseudo-random sequence;
   c. assigning a first packet of the pseudo-random sequence a random number as its packet number and for each subsequent packet number in the pseudo-random sequence, adding a random number to the packet number of the preceding packet to form an increasing sequence of random numbers or subtracting a random number from the packet number of the preceding packet to form a decreasing sequence of random numbers; and
   d. transmitting the plurality of packets from the source node to the destination node.

2. The method of claim 1, wherein distributing the sequence of characters among a plurality of packets comprises distributing into each packet of the plurality of packets, a single character of the sequence of characters.

3. The method of claim 1, further comprising:
   a. arranging, at the destination node, the plurality of packets according to the increasing or decreasing pseudo-random sequence such that the sequence of characters is reconstructed.

4. A method of transmitting transaction data comprising a sequence of characters from a source node to a destination node through a distributed network interconnecting a plurality of network nodes including the source node and the destination node, the method comprising:
   a. distributing the sequence of characters among a plurality of packets;
   b. assigning each packet of the plurality of packets a packet number; and
   c. assigning to each of the plurality of packets a route from the source node to the destination node such that at least some of the plurality of packets are assigned different routes from others of the plurality of packets; and
   d. transmitting the plurality of packets from the source node to the destination node via their assigned routes.

5. The method of claim 4, wherein the plurality of packets are transmitted from the source node to the destination node by transmitting each packet of the plurality of packets along a different route from the source node to the destination node.

6. The method of claim 4, wherein a packet exists for each character of the sequence of characters, and distributing the sequence of characters among a plurality of packets comprises distributing into each packet of the plurality of packets, a single character of the sequence of characters.

7. The method of claim 4, further comprising arranging, at the destination node, the plurality of packets such that the transaction data is reconstructed.

8. A method of transmitting transaction data comprising a sequence of characters from a source node to a destination node through a distributed network interconnecting a plurality of network nodes including the source node and the destination node, the method comprising:
   a. distributing the sequence of characters among a plurality of packets;
   b. assigning each packet of the plurality of packets a packet number according to a pseudo-random function such that the packet numbers form a pseudo-random sequence;
   c. assigning to each of the plurality of packets a route from the source node to the destination node, such that at least some of the plurality of packets are assigned different routes from others of the plurality of packets; and
   d. arranging, at the destination node, the plurality of packets according to the pseudo-random sequence of packet numbers such that the transaction data is reconstructed.

9. A method of transmitting transaction data comprising a sequence of characters from a source node to a destination node through a distributed network interconnecting a plurality of network nodes including the source node and the destination node, the method comprising:
   a. encrypting the transaction data;
   b. distributing the encrypted transaction data among a plurality of packets;
   c. assigning each packet of the plurality of packets a packet number according to a pseudo-random function such that the packet numbers form a pseudo-random sequence;
   d. assigning to each of the plurality of packets a route from the source node to the destination node, such that at least some of the plurality of packets are assigned different routes from others of the plurality of packets;
   e. transmitting the plurality of packets from the source node to the destination node via their assigned routes: and
   f. arranging, at the destination node, the plurality of packets according to the pseudo-random sequence of packet numbers such that the transaction data is reconstructed.

10. A method of transmitting transaction data comprising a sequence of characters from a source mode to a destination node through a distributed network, the method of comprising:
    a. distributing the sequence of characters among a plurality of packets;
    b. assigning each packet of the plurality of packets a packet number according to a pseudo-random function such that the packet numbers form an increasing or decreasing sequence; and
    c. transmitting the plurality of packets from the source node to the destination node.

* * * * *